United States Patent
Murata et al.

(10) Patent No.: US 9,092,018 B2
(45) Date of Patent: Jul. 28, 2015

(54) POSITIONER

(75) Inventors: Kouichirou Murata, Tokyo (JP); Kouji Okuda, Tokyo (JP); Hiroaki Nagoya, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 687 days.

(21) Appl. No.: 13/418,627

(22) Filed: Mar. 13, 2012

(65) Prior Publication Data

US 2012/0253534 A1    Oct. 4, 2012

(30) Foreign Application Priority Data

Mar. 30, 2011   (JP) ................................. 2011-074841

(51) Int. Cl.
*G05D 11/00*   (2006.01)
*G05B 15/02*   (2006.01)

(52) U.S. Cl.
CPC ..................... *G05B 15/02* (2013.01)

(58) Field of Classification Search
CPC ..................................... G05B 15/02
USPC .............. 700/282, 295; 251/129.01
See application file for complete search history.

(56) References Cited

U.S. PATENT DOCUMENTS

| | | | | |
|---|---|---|---|---|
| 6,225,776 B1 * | 5/2001 | Chai | ................ | 320/109 |
| 2006/0092039 A1 * | 5/2006 | Saito et al. | ................ | 340/825.37 |
| 2009/0113973 A1 * | 5/2009 | Cox, III | ................ | 72/165 |

FOREIGN PATENT DOCUMENTS

JP   2004-151941 A   5/2004

* cited by examiner

*Primary Examiner* — Kenneth Lo
*Assistant Examiner* — Chad Rapp
(74) *Attorney, Agent, or Firm* — Troutman Sanders LLP

(57) ABSTRACT

The range of electric currents that can be assumed by a supply electric current is categorized into a plurality of electric current ranges, where, for each electric current range category, there are combinations of functions, wherein the total value for the electric current required is less than the upper limit value, and no less than the lower limit value, for the electric current range established, and a table wherein these combinations are established is stored in memory. An actual value is detected for a supply current I to ascertain the category of electric current to which the supply electric current I applies, the combination of functions established for the applicable category of electric currents is read out from the table, and operation of the function circuit portions for the functions of the combination that has been read out is enabled, and operation of the other function circuit portions is disabled.

2 Claims, 2 Drawing Sheets

TB1

| Category | Electric Current Range | Combination of Functions |
|---|---|---|
| 1 | 0 through Ith1 | Null |
| 2 | Ith1 through Ith2 | A |
| 3 | Ith2 through Ith3 | A + B |
| 4 | Ith3 through Ith4 | A + B + C |
| 5 | Ith4 through Ith5 | A + B + C + D |
| 6 | Ith5 through 20 mA | A + B + C + D + E |

Ith1=IA,
Ith2=IA+IB,
Ith3=IA+IB+IC,
Ith4=IA+IB+IC+ID,
Ith5=3.8mA

| Category | Electric Current Range | Combination of Functions |
|---|---|---|
| 1 | 0 through Ith1 | Null |
| 2 | Ith1 through Ith2 | A |
| 3 | Ith2 through Ith3 | A + B |
| 4 | Ith3 through Ith4 | A + B + C |
| 5 | Ith4 through Ith5 | A + B + C + D |
| 6 | Ith5 through 20 mA | A + B + C + D + E |

Ith1=IA、
Ith2=IA+IB、
Ith3=IA+IB+IC、
Ith4=IA+IB+IC+ID、
Ith5=3.8mA

| Category | Electric Current Range | Combination of Functions |
|---|---|---|
| 1 | 0 through Ith1 | Null |
| 2 | Ith1 through Ith2 | Priority 1 or above |
| 3 | Ith2 through Ith3 | Priority 2 or above |
| 4 | Ith3 through Ith4 | Priority 3 or above |
| 5 | Ith4 through Ith5 | Priority 4 or above |
| 6 | Ith5 through 20 mA | Priority 5 or above |

Ith1=IA、
Ith2=IA+IB、
Ith3=IA+IB+IC、
Ith4=IA+IB+IC+ID、
Ith5=3.8mA

FIG. 4

| Priority | Function |
|---|---|
| 1 | A |
| 2 | B |
| 3 | C |
| 4 | D |
| 5 | E |

POSITIONER

CROSS REFERENCE TO RELATED APPLICATIONS

The present application claims priority under 35 U.S.C. §119 to Japanese Patent Application No. 2011-074841, filed Mar. 30, 2011, which is incorporated herein by reference.

FIELD OF TECHNOLOGY

The present invention relates to a positioner for receiving a supply of an electric current through a pair of electric wires from a higher-level system to produce its own operating power supply from the electric current that is supplied, and for controlling the degree of opening of a regulator valve in accordance with a value of the supplied electric current.

BACKGROUND

Conventionally this type of positioner is designed so as to operate with an electric current between 4 and 20 mA sent through a pair of electric wires from a higher-level system. For example, if a current of 4 mA is sent from the higher-level system, the valve opening of the valve is set to 0%, and if a current of 20 mA is sent, then the valve opening of the valve is set to 100%.

In this case, the supplied electric current from the higher-level system varies in the range of 4 mA (the lower limit electric current value) through 20 mA (the higher limit electric current value), and thus the internal circuitry within the positioner must operate on an electric current of no more than the 4 mA (for example, 3.8 mA) that can always be secured as an electric current value that is supplied from the higher-level system.

The opening setting value for the valve is inputted into the positioner by the higher-level system. Moreover, the actual opening value for the valve is obtained through the opening sensor. Consequently, the positioner is able to perform valve fault diagnostics, self-diagnostics, and the like, through performing calculations on the relationship between the opening setting value and the actual opening value for the valve. The provision of such fault diagnostic functions in the positioner makes it possible to increase the functionality of the system at a low cost, through eliminating the need for providing a separate fault diagnosing device (See, for example, Japanese Unexamined Patent Application Publication 2004-151941).

For reasons such as these, in recent years positioners have been provided with communication functions, self-diagnostic functions, valve diagnostic functions, valve opening output functions, and other added functions, in addition to the primary function (the valve control function (the basic function)) of controlling the opening of the valve.

However, even though there is a substantial improvement in high-functionality of the positioner through the incorporation of the added functions described above, there is the drawback that in order to exhibit all of these added functions, the electric current that is required increases as well If, in this case, the electric current that is supplied is insufficient for the electric current that is required in order to exhibit all of these added functions, the added functions will cease to operate properly, and, for example, there will be the risk of problems such as unidentifiable errors being sent continuously to the higher-level system, or communications with the higher-level system failing.

The examples of the present invention solve problems such as set forth above, and the object thereof is to provide a positioner that is able to exhibit high functionality, while ameliorating vulnerabilities when the electric current supply is inadequate.

SUMMARY

A positioner for receiving a supply of an electric current through a pair of electric wires from a higher-level system to generate its own operating power supply from the electric current that is supplied, and for controlling the degree of opening of a regulator valve in accordance with a value of the supplied electric current, having a function circuit portion provided for a basic function and for each individual added function, with the function for performing the control of the opening of the regulator valve as the basic function and other functions that are added to this basic function as added functions; device for categorizing, into a plurality of electric current categories, the range of electric currents that can be assumed by the supply electric current and storing a table wherein is determined, for each electric current range category, a combination of said functions for which a total value of an electric current that is required is less than an upper limit value, and no less than a lower limit value, of the electric current range; supply electric current detector for detecting an actual value of the supply electric current; and device for ascertaining the category of electric current to which the actual value for the detected electric current applies, for reading out, from the table, a combination of functions established for the applicable category of electric current, for enabling operation of a function circuit portion for a function of the combination that has been read out, and for disabling operation of another function circuit portion.

Given the present invention, the electric current range over which a supply electric current can be received (for example, between 0 and 20 mA) is categorized into four electric current ranges, where no combination of functions is established in the first category of electric current ranges (for example, between 0 and α mA (α<β<γ)), a communication function is established as the combination of functions in the electric current range of the second category (for example, between α and β mA), a communication function and a self-diagnostic function is established as the combination of functions in the electric current range of the third category (for example, between β and γ mA), and the basic function and all added functions are established as the combination of functions in the electric current range of the fourth category (for example, between γ And 20 mA), in which case if the supply electric current is insufficient and falls into the electric current range of the third category from the electric current range of the fourth category, then the operation of the function circuit portions for all of the functions aside from the communication function and the self-diagnostic function is stopped, and the operation of the function circuit portion for the communication function and of the function circuit portion for the self-diagnostic function is continued. Moreover, if the supply electric current is even less sufficient, and falls into the electric current range of the second category from the electric current range of the third category, then the operation of the function circuit portion for the self-diagnostic function is stopped and only the operation of the function circuit portion for the communication function is continued. Moreover, if there is a fall from the electric current range of the second category into the electric current range of the first category, then the operation of all functions is stopped.

Given the examples of the present invention, the range of electric currents can be assumed from the supply electric current is categorized into a plurality of electric current ranges, combinations of functions are established for each of the categories of electric current ranges such that the total value for the required electric currents will be less than an upper limit value and no more than a lower limit value for the electric current range, the category of the electric current ranges to which the actual value for the supply electric current that is detected applies is ascertained the combination of functions established for the applicable category of electric current range is read out, the operation of the function circuit portions for the functions of the combination that has been read out is enabled, and the operation of the other function circuit portions is disabled, thus making it possible to ameliorate the vulnerability to an insufficient supply electric current white maintaining high functionality.

BRIEF DESCRIPTION OF THE DRAWINGS

FIG. 2 is a diagram illustrating one example of a table illustrating combinations of categories of electric current ranges used in this positioner, and functions that are established for each of the categories of electric current ranges.

FIG. 3 is a diagram illustrating another example of a table used in this positioner.

FIG. 4 is a diagram illustrating the relationships of priorities and functions used in this table.

DETAILED DESCRIPTION

Figure 1:
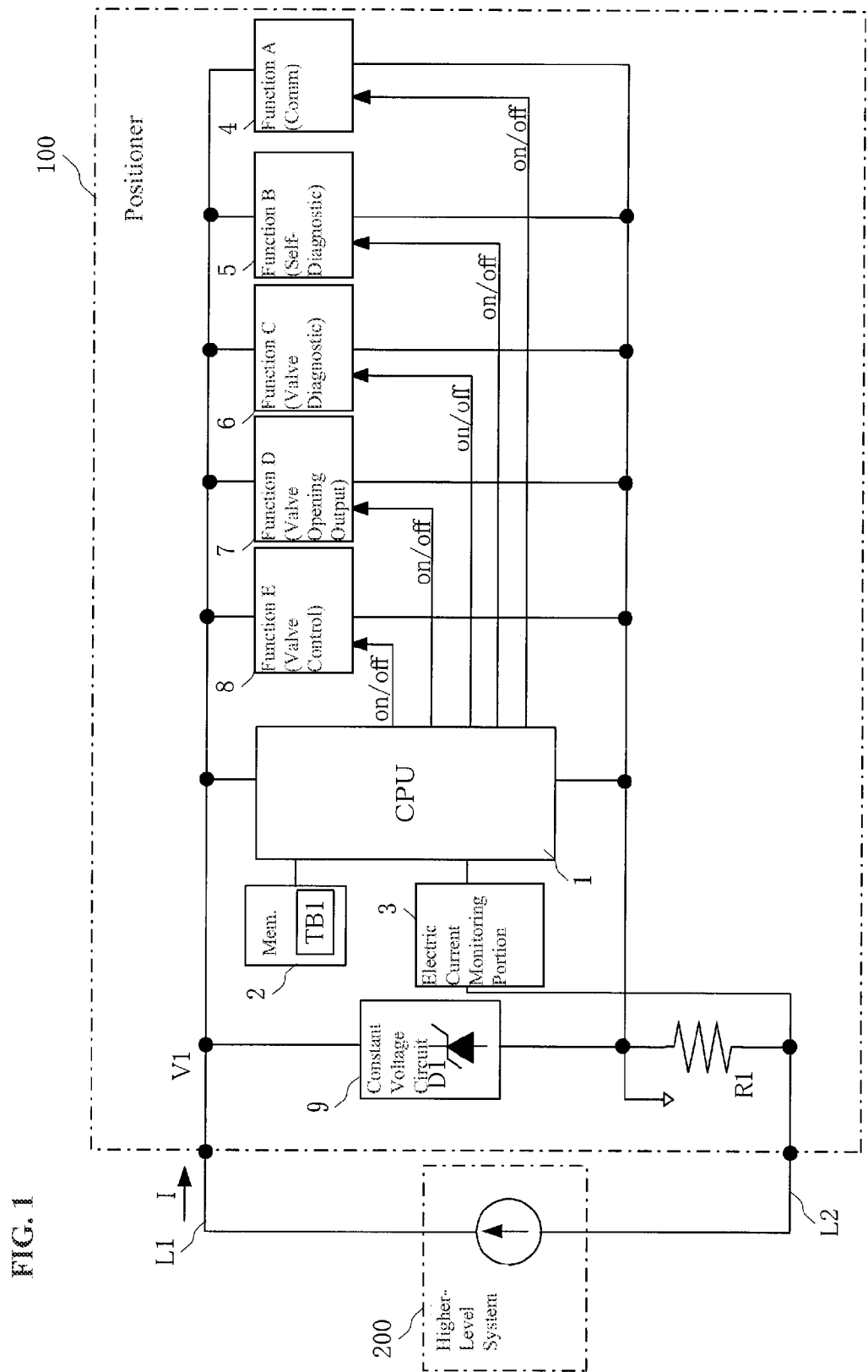
FIG. 1 is a block diagram illustrating the critical portions in an example of a positioner according to the present invention.

Examples according to the present invention are explained below in detail, based on the drawings, FIG. 1 is a block diagram illustrating the critical portions in an example of a positioner according to the present invention. This positioner 100 receives a supply of an electric current I through a pair of electric wires L1 and the L2 from the higher-level system 200 and produces its own operating power supply from the electric current I that is supplied, and, on the other hand, also controls the degree of opening of a regulator valve, not shown, in accordance with the value of the supplied electric current I.

The positioner 100 includes a CPU 1, a memory 2, an electric current monitoring portion 3, a communication function circuit portion 4, a self-diagnostic function circuit portion 5, a valve diagnostic function circuit portion 6, a valve opening outputting unction circuit portion 7, a valve controlling function circuit portion 8, a constant voltage circuit 9 that includes a zener diode D1, and a resistor R1.

In this positioner 100, the constant voltage circuit 9 receives the supply of power from a higher-level system 200 to produce a constant voltage V1, and supplies this produced constant voltage V1 to the CPU 1, the communication function circuit portion 4, the self-diagnostic function circuit portion 5, the valve diagnostic function circuit portion 6, the valve opening outputting function circuit portion 7, and the valve controlling function circuit portion 8.

The supply electric current I from the higher-level system 200 flows into the CPU 1, the communication function circuit portion 4, the self-diagnostic function circuit portion 5, the valve diagnostic function circuit portion 6, the valve opening outputting function circuit portion 7, and the valve controlling function circuit portion 8, and flows together to return to the higher-level system 200 through the resistor R1. The electric current monitoring portion 3 detects the electric current that is returned to the higher-level system 200 as the actual value for the supply electric current I to the positioner 100.

The communication function circuit portion 4 is provided as the circuit portion that performs the communication function (function A (an added function)) for performing communication with the higher-level system 200. The self-diagnostic function circuit portion 5 is provided as the circuit portion for performing the self-diagnostic function (function B (an added function)) for performing fault diagnostics on the positioner itself. The valve diagnostic function circuit portion 6 is provided as the circuit portion for performing the valve diagnostic function (function C (an added function)) for performing the valve fault diagnostics. The valve opening outputting function circuit portion 7 is provided as the circuit portion for performing the valve opening outputting function (function D (an added function)) for outputting, to the higher-level system 200, the actual degree of opening of the valve. The valve controlling function circuit portion 8 is provided as the circuit portion for performing the valve opening controlling function (function E (the basic function)) for performing control of the degree of opening of the valve in accordance with a command from the higher-level system 200.

The CPU 1 follows a program that is stored in the memory 2 to turn ON/OFF the operations of the communication function circuit portion 4, the self-diagnostic function circuit portion 5, the valve diagnostic function circuit portion 6, the valve opening outputting function circuit portion 7, and the valve controlling function circuit portion 8. The memory 2 stores, in addition to the aforementioned program, a table TB1 wherein the range of electric currents that can be assumed by the supply electric current I (between 0 and 20 mA) is categorized into a plurality of electric current ranges, and wherein a combination of the functions A through the E, wherein, for each of the categorized electric current ranges, the total value for the electric current that is required is less than the upper limit value and no less than the lower limit value for the electric current range that has been categorized.

An example of the table TB1 is shown in Table 2. In this table TB1, if the electric current required by the communication function circuit portion 4 (function A) is IA, the electric current required for the self-diagnostic function circuit portion 5 (function B) is IB, the electric current required by the valve diagnostic function circuit portion 6 (function C) is IC, the electric current required by the valve opening outputting function circuit portion 7 (function D) is ID, and the electric current required by the valve controlling function circuit portion 8 (function E) is IE, then the range of electric currents that can be assumed by the electric current I (0 through 20 mA) is categorized into six electric current ranges, with Ith1=IA, Ith2=IA+IB, Ith3=IA+IB+IC, Ith4=IA+IB+IC+ID, and Ith5=3.8 mA. Moreover, "Null" is defined as the function for the electric current range in Category 1 (0 through Ith1), function A is established as the combination of functions for the electric current range of Category 2 (Ith1 through Ith2), function A and function B are established as the combination of functions for the electric current range of Category 3 (Ith2 through Ith3), function A, function B, and function C are established as the combination of functions for the electric current range of Category 4 (Ith3 through Ith4), function A, function B, function C, and function D are established as the combination of functions for the electric current range of Category 5 (Ith4 through Ith5), and function A, function B, function C, function the D, and function E are established as the combination of functions for the electric current range of Category 6 (Ith5 through 20 mA).

Note that in the valve controlling function circuit portion 8, if the valve opening is 0%, then an electric current of 0 mA required, but if the valve opening is 100%, then an electric current of 16 mA is required, and thus the 16 mA that is the maximum electric current at the time of valve control is defined as the electric current IE that is required by the valve controlling function circuit portion 8 (function E), Moreover, in the present example, the functions A, B, C, D, and E, in that sequence, are the functions with the highest priority as critical functions that must remain when the supply electric current I is insufficient.

Moreover, in the present example, no combination of functions is established for the electric current range in Category 1 (0 through Ith1), and thus the electric current range in Category 2 (Ith1 through Ith2 is the category having the smallest electric current value of all of the categories wherein combinations of functions are established. The function A (the communication function) is established as the combination of functions in the electric current range of this Category 2.

When Functioning Properly: 4 mA≤I≤20 mA

At this point let us assume that the supply electric current I from the higher-level system 200 varies in the range of 4 mA≤I≤20 mA, and proper operations are performed. In this case, the CPU 1 confirms that the actual value for the supply electric current I is in the electric current range of Category 6 (Ith5 through 20 mA), and reads in, from the table TB1, "A+B+C+D+E" as the combination of functions for the electric current range of this applicable Category 6, to enable operation of the function circuit portions for those functions in the combination that has been read out, and to disable operation of any other function circuit portions.

In this case, all of the functions have been read out, and thus there are no function circuit portions for which operation is disabled, and operation is enabled for the function circuit portions for all of the functions. Consequently, the CPU 1 causes all of the function circuit portions of the communication function circuit portion 4, the self-diagnostic function circuit portion 5, the valve diagnostic function circuit portion 6, the valve opening outputting function circuit portion 7, and the valve controlling function circuit portion 8 to continue to operate.

If the Supply Electric Current I is Less than Ith5

If, from such a situation, the supply electric current I is insufficient, so as to fall below Ith5=3.8 mA, the CPU 1 confirms that the actual value for the supply electric current I is in the electric current range of Category 5 (Ith4 through Ith5), and reads in, from the table TB1, "A+B+C+D" as the combination of functions for the electric current range of the applicable Category 5, to enable operation of the function circuit portions for the combination of functions that has been read in, while disabling operation of any other function circuit portions.

In this case, the CPU 1 disables the operation of the valve controlling function circuit portion 8, as a function circuit portion other than for the functions of the "A+B+C+D." Doing so causes the operation of the valve controlling function circuit portion 8 to stop, and causes the operations of the communication function circuit portion 4, the self-diagnostic function circuit portion 5, the valve diagnostic function circuit portion 6, and the valve opening outputting function circuit portion 7 to continue.

In this case, the total value for the electric current required for the communication function circuit portion 4, the self-diagnostic function circuit portion 5, the valve diagnostic function circuit portion 6, and the valve opening outputting function circuit portion 7 is IA+IB+IC+ID, where the tower limit value for the electric current range of Category 5 is defined as Ith4=IA+IB+IC+ID, making it possible to continue the operations of the communication function circuit portion 4, the self-diagnostic function circuit portion 5, the valve diagnostic function circuit portion 6, and the valve opening outputting function circuit portion 7 properly, even with the insufficient supply electric current I.

If the Supply Electric Current I Less than Ith4

If, from such a situation, the supply electric current I is more insufficient, so as to fall below Ith4, the CPU 1 confirms that the actual value for the supply electric current I is in the electric current range of Category 4 (Ith3 through Ith4), and reads in, from the table TB1, "A+B+C" as the combination of functions for the electric current range of the applicable Category 4, to enable operation of the function circuit portions for the combination of functions that has been read in, white disabling operation of any other function circuit portions.

In this case, the CPU 1 disables the operation of the valve controlling function circuit portion 8 and the valve opening outputting function circuit portion 7, as function circuit portions other than for the functions of the "A+B+C." Doing so causes the operation of the valve opening outputting function circuit portion 7, in addition to the valve controlling function circuit portion 8, to stop, and causes the operations of the communication function circuit portion 4, the self-diagnostic function circuit portion 5, and the valve diagnostic function circuit portion 6 to continue.

In this case, the total value for the electric current required for the communication function circuit portion 4, the self-diagnostic function circuit portion 5, and the valve diagnostic function circuit portion 6 is IA+IB+IC, where the tower limit value for the electric current range of Category 4 is defined as Ith3=IA+IB++IC, making it possible to continue the operations of the communication function circuit portion 4, the self-diagnostic function circuit portion 5, and the valve diagnostic function circuit portion 6, even with the insufficient supply electric current I.

If the Supply Electric Current I is Less than Ith3

If, from such a situation, the supply electric current I is more insufficient, so as to fall below Ith3, the CPU 1 confirms that the actual value for the supply electric current I is in the electric current range of Category 3 (Ith2 through Ith3), and reads in, from the table TB1, "A+B" as the combination of functions for the electric current range of the applicable Category 3, to enable operation of the function circuit portions for the combination of functions that has been read in, while disabling operation of any other function circuit portions.

In this case, the CPU 1 disables the operation of the valve controlling function circuit portion 8 the valve opening outputting function circuit portion 7, and the valve diagnostic function circuit portion 6, as function circuit portions other than for the functions of the "A+B." Doing so causes the operation of the valve diagnostic function circuit portion 6, in addition to the valve opening outputting function circuit portion 7 and the valve controlling function circuit portion 8, to stop, and causes the operations of the communication function circuit portion 4 and the self-diagnostic function circuit portion 5 to continue.

In this case, the total value for the electric current required for the communication function circuit portion 4 and the self-diagnostic function circuit portion 5 is IA+IB, where the lower limit value for the electric current range of Category 3 is defined as Ith2=IA+IB, making it possible to continue the operations of the communication function circuit portion 4 and the self-diagnostic function circuit portion 5, even with the insufficient supply electric current I.

If the Supply Electric Current I is Less than Ith2

If from such a situation, the supply electric current I is more insufficient, so as to fall below Ith2, the CPU 1 confirms that the actual value for the supply electric current I is in the electric current range of Category 2 (Ith1 through Ith2), and reads in, from the table TB1, "A" as the combination of functions for the electric current range of the applicable Category 2, to enable operation of the function circuit portions for the combination of functions that has been read in, while disabling operation of all other function circuit portions.

In this case, the CPU 1 disables the operation of the valve controlling function circuit portion 8 the valve opening outputting function circuit portion 7, the valve diagnostic function circuit portion 6, and the self-diagnostic function circuit portion 5, as function circuit portions other than for the functions of the "A." Doing so causes the operation of the self-diagnostic function circuit portion 5, in addition to valve diagnostic function circuit portion 6, the valve opening outputting function circuit portion 7 and the valve controlling function circuit portion 8, to stop, and causes the operation of only the communication function circuit portion 4 to continue.

In this case, the total value for the electric current required for the communication function circuit portion 4 is IA, where the lower limit value for the electric current range of Category 2 is defined as Ith1=IA, making it possible to continue the operations of the communication function circuit portion 4, even with the insufficient supply electric current I.

If the Supply Electric Current I is Less than Ith1

If, from such a situation, the supply electric current I is more insufficient, so as to fall below Ith1, the CPU 1 confirms that the actual value for the supply electric current I is in the electric current range of Category 1 (0 through Ith1), and reads in, from the table TB1, the combination of functions for the electric current range of the applicable Category 1, to enable operation of the function circuit portions for the combination of functions that has been read in, while disabling operation of any other function circuit portions.

In this case, no combination of functions has been established for the electric current range of Category 1 (0 through Ith1), so the CPU 1 disables the operation of all of the function circuit portions. As a result, the operation of the communication function circuit portion 4 is stopped along with that of the valve controlling function circuit portion 8, the valve opening outputting function circuit portion 7, the valve diagnostic function circuit portion 6, and the self-diagnostic function circuit portion 5, to stop the operation of all of the function circuit portions.

In this way, if the supply electric current I in the present example is insufficient, then it is possible to continue the operation of those function circuit portions that can be covered by the insufficient supply electric current while stopping the operation of the other function circuit portions, ameliorating the vulnerability to the case when the supply electric current is insufficient, white still exhibiting high functionality.

Additionally, in the present example, the function circuit portions are stopped sequentially beginning with those with the lowest priority, to enable an adequate electric current to be supplied to the critical function circuit portions having high priority, thus making it possible to execute reliably those critical functions that have high priority, even in a situation wherein the supply electric current has been reduced.

Moreover, in the present example, the communication function circuit portion 4 is defined as the function circuit portion with the highest priority, that is, function A (the communication function is established as the combination of functions in the category with the smallest electric current value of all of the electric current values in the categories for which combinations of functions have been established in the table TB1, and thus even if the supply electric current I is insufficient, still the communication function is maintained until the end, making it possible to provide notification of the occurrence of a fault to the higher-level system 200, to send, to the higher-level system 200, the data that has been stored in the memory portion within the positioner 100 up until that point, or the like.

Note that while in the example set forth above, a table TB1 wherein combinations of the functions A through E were established for each of the electric current ranges was used, a table TB2, as illustrated in FIG. 3, wherein combinations of the functions A through E for each of the electric current ranges may be selected based on the priority order of the combinations may be used instead. In this case, the priority, as illustrated in FIG. 4, would be established as priority 1, 2, 3, 4, and 5 in the sequence of the functions A, B, C, the D, and E.

Given this table TB2, if the actual value for the supply current I is in the electric current range of Category 6 (Ith5 through 20 mA), then all of the functions A through E of priority level 5 and above are selected, where if the actual value for the supply electric current I is in the electric current range of Category 5 (Ith4 through Ith5), then a combination of the functions A through D are selected as the functions of priority level 4 and above. Similarly, if the actual value for the supply current I is in the electric current range of Category 4 (Ith3 through Ith4), then the functions A, B, and C of priority level 3 and above are selected, where if the actual value for the supply electric current I are in the electric current range of Category 3 (Ith2 through Ith3), then a combination of the functions A and B are selected as the functions of priority level 2 and above, and if the actual value for the supply electric current I is in the electric current range of Category 2 (Ith1 through Ith2), then only function A is selected as the function of priority level 1 or above. The "table" referred to in the present examples includes also such tables TB2.

Moreover, while in the examples set forth above the function circuit portions were stopped one at a time as the insufficiency in the supply electric current I advanced, they need not necessarily be stopped one at a time. Moreover, there is freedom also in the combinations of the function circuit portions that are stopped. For example, the range of electric currents can be assumed by the supply electric current I (0 through 20 mA) may be categorized into an electric current range for Category 1 for between 0 and Ith1, an electric current range of category 2 for between Ith1 and Ith4, an electric current range of category 3 for between Ith4 and Ith5, and an electric current range of Category 4 for between Ith5 and 20 mA, wherein if the actual value for the supply electric current I is in the electric current range of Category 2, then only the communication. function circuit portion 4 remains, and the operations of the other function circuit portions are all be stopped.

The positioner according to the examples of the present invention can be used in a variety of fields, such as process control, for controlling the opening of a regulator valve.

The invention claimed is:

1. A positioner receiving a supply of an electric current through a pair of electric wires from a higher-level system to generate its own operating power supply from the electric current that is supplied, and controlling the degree of opening of a regulator valve in accordance with a value of the supplied electric current, comprising:
   a function circuit portion providing a basic function and individual added function, with the function performing the control of the opening of the regulator valve as the basic function and other functions that are added to this basic function as added functions;

a current range device categorizing, into a plurality of electric current categories, the range of electric currents that can be assumed by the supply electric current and storing a table wherein is determined, for each electric current range category, a combination of said functions for which a total value of an electric current that is required is less than an upper limit value, and no less than a lower limit value, of the electric current range;

a supply electric current detector detecting an actual value of the supply electric current; and an electric current category device ascertaining the category of electric current to which the actual value for the detected electric current applies, for reading out, from the table, a combination of functions established for the applicable category of electric current, enabling operation of a function circuit portion for a function of the combination that has been read out, and for disabling operation of another function circuit portion.

2. The positioner as set forth in claim 1, comprising:

a communication function circuit portion, as an added function, performing communication with the higher-level system; wherein a communication function is established in the table as the combination of functions for the category with the smallest electric current value of the categories of electric current ranges for which combinations of functions are established.

* * * * *